April 30, 1935.     M. D. HELFRICH     1,999,904
BALL COCK
Filed Aug. 10, 1931
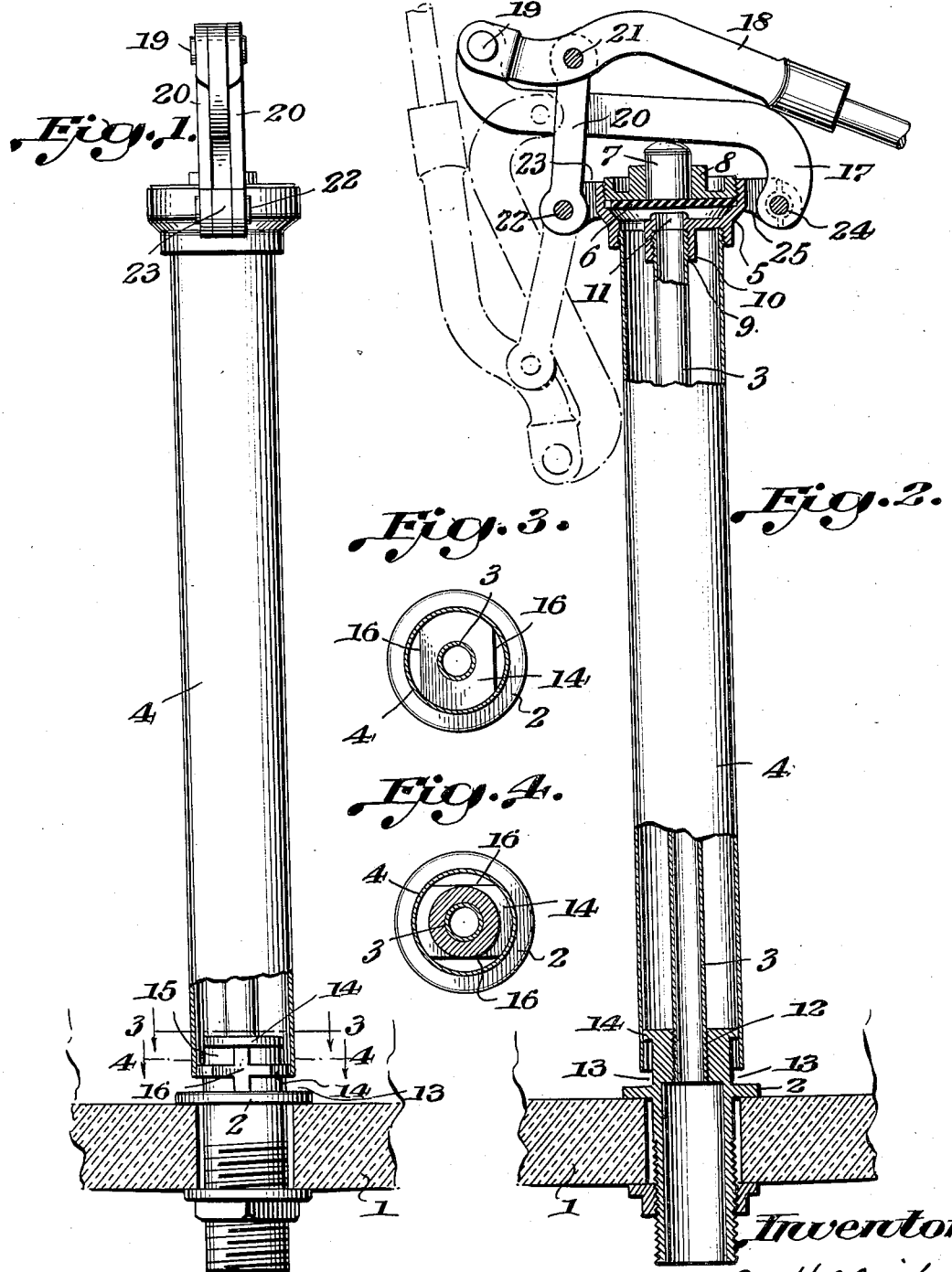

Patented Apr. 30, 1935

1,999,904

UNITED STATES PATENT OFFICE 1,999,904

BALL COCK

Michael D. Helfrich, Evansville, Ind.

Application April 10, 1931, Serial No. 529,198

3 Claims. (Cl. 137—104)

This invention relates to improvements in ball cocks for water closet flush tanks and relates, more particularly, to the means for silencing the flow of water from the hush-tube into the tank and the mounting of the hush-tube and water tube on the shank by which the complete ball cock is attached to the bottom of the flush tank.

As heretofore constructed, the water supply tube and the hush tube have had a weak connection to the ball cock shank, tending to bending or breakage at the bottom of the tank, should an unauthorized person tamper with the ball cock or the hush tube or float ball lever.

An object of my invention is to overcome these defects by the provision of improved means constituting a part of the ball cock shank by which connection to the hush-tube is strengthened and which also silences the flow of the water and directs it in a sheet into the bottom of the tank. These improvements also create a back pressure in the hush-tube so that the water will pass through the reseal tube commonly used. Furthermore, these latter improvements obviate the necessity of an extra casting and the machining of the ball cock shank and make the ball cock very quiet in use, besides providing for adjustment of the hush-tube for the purpose of controlling the water according to the pressure existent in the particular locality where the device is used.

These latter improvements embody flanges on the upper part of the ball cock shank, which flanges have cut-away parts for the flow of the water, said cut-away parts being arranged in staggered relationship on the different flanges. This breaks up the flow of water and causes it to issue from the bottom of the hush-tube in the form of a sheet and with a minimum noise. In addition, the cut-away flanges tightly fit within the lower part of the hush-tube and reinforce it and afford a strong joint between the hush-tube and the ball cock shank while permitting screwing of the hush-tube up or down to regulate the flow according to the pressure.

The cut-away, spaced flanges which are provided on the upper end of the ball cock shank, tightly fit into the lower or discharge end of the hush-tube and support, brace, and provide a rigid connection which prevents the water supply tube from being broken off, inasmuch as the hush-tube encloses the water supply tube and houses and guards it. This construction overcomes what has been a serious defect in earlier ball cocks.

A practical embodiment of the invention is hereinafter described and is shown in the accompanying drawing, in which:

Figure 1 is a side elevation, the lower part of the hush-tube being broken away;

Fig. 2 is a similar view taken at right angles to Fig. 1, the upper and lower parts of the hush-tube and the ball cock body and ball cock shank being in section, full lines representing the fulcrum lever, links, and float ball lever in position for use, dotted lines showing how these parts may be swung backwardly, without detachment, by removing the single thumb screw;

Fig. 3 is a section on the line 3—3, Fig. 1; and

Fig. 4 is a section on the line 4—4, Fig. 1.

The bottom of the flush tank appears at 1, the ball cock shank is shown at 2, the supply tube appears at 3 and the hush tube is disposed at 4. The ball cock body 5 carries the usual diaphragm valve 6, the plunger 7, and the removable plug or closure 8.

The supply tube 3 is provided with screw threads 9 at its upper end which engage a screw threaded socket in the spider 10 and said tube supplies water to the seat 11. The lower end of the tube 3 is screwed into the improved upper end of the ball cock shank at 12 in a permanent manner so that the tube 3 is rigid with the shank 2. Adjustment up and down of the hush-tube 4 may be had by virtue of the screw threaded connection 9 by which means the effective water mouth or outlet 13 may be varied to suit the water pressure.

The upper part of the shank 2 is provided with integral flanges or discs 14, of which there may be two or more. These discs or flanges are of a diameter adapting them to snugly fit the interior wall of the hush-tube 4 and they are spaced apart as shown at 15. The respective flanges 14 have "flats" or cut-away parts 16, these cut-away parts on one of the flanges being disposed in offset relationship to the cut-away parts on the other flange; consequently, the water flowing down the hush-tube 4 is checked and made to circulate in the passage 15, after passing the upper flange before it can have an outlet through the flattened parts 16 of the flange next below and then pass into the outlet 13, from which it issues in a sheet into the tank. The fit of the upper part of the shank 2 into the bottom of the hush-tube forms a rigid connection for the hush-tube 4 and minimizes danger of the hush-tube becoming displaced or deliberately bent by unauthorized persons, thereby guarding, supporting and bracing the water supply tube 3 and preventing it from becoming bent or broken off, thus overcoming what has been a serious defect in earlier ball cocks.

The operating means at the upper end of the ball cock embody a fulcrum lever 17, a float ball lever 18, which is pivoted thereto at 19, a pair of links 20 which are pivoted at 21 to the float ball lever 18 and are pivoted at 22 to an ear 23 on the ball cock body 5, and a single thumb screw 24 by which the fulcrum lever 17 is detachably pivoted to a pair of ears 25 on the body 5.

Heretofore, in addition to the thumb screw for pivotally connecting the lever 17 to the body 5, there has been provided a pair of links integral with the said body, to which links the float ball lever 18 has been pivotally connected by a second thumb screw, necessitating the provision of two thumb screws, and the employment of a linkage between the fulcrum lever and the float ball lever. With the old construction, both of the thumb screws have had to be removed, completely detaching the levers, when access to the ball cock became necessary. The detachment of the levers often resulted in loss of the thumb screws and, in addition, the links or lugs integral with the body have been in the way of access to the ball cock.

My present improvements overcome these defects, as it will be seen that it is only necessary to remove the single thumb screw 24 to permit the entire operative system to be thrown back, as shown in dotted lines in Fig. 2, completely clearing the top of the appliance and permitting ready access to the ball cock.

Preferably, the connections 19, 21, 22, are rivets, so that the parts cannot become detached.

As usual, the lever 17 bears on the plunger 7, for operating the diaphragm 6.

What I claim is:

1. In a ball cock, the combination with a ball cock shank having an upper part provided with a plurality of spaced flanges whose edges have cut-away parts, the cut-away parts of the respective flanges being offset or staggered in relation to each other, a hush-tube telescoped over the aforesaid flanges and fitting the edges thereof, thereby providing staggered water passages between the flanges and the hush-tube, the lower end of the hush-tube being arranged for the outflow of water after it flows through the passages and between the said flanges, and a supply tube connected to said shank.

2. In a ball cock, the combination with a ball cock shank having an upper part provided with a plurality of spaced flanges having openings, the openings of the respective flanges being offset or staggered relative to each other, a hush-tube telescoped over said flanges and fitting the edges thereof, thereby providing staggered water passages within the hush-tube, the lower end of the hush-tube being arranged for the outflow of water after it flows through the passages, and a supply tube connected to said shank.

3. In a ball cock, the combination with a ball cock shank the upper part of which is provided with flanges having water passages, of a supply tube connected directly to and rising above said shank, a ball cock body to which the upper end of the supply tube is adjustably connected, and a hush-tube connected at its upper end to the ball cock body and having the lower end thereof tightly fitting around and vertically slidable relative to the upper part of the ball cock shank and engaging with and reinforced by said upper part of the shank, whereby the hush-tube is reinforced at its lower end and is supported by said shank against lateral movement and is slidably adjustable up and down on the upper part of the shank by effecting adjustment of the supply tube as aforesaid to suit the water pressure and to silence the flow of water through said water passages and below the lower end of the hush-tube, said hush-tube having the shank extending into the lower end portion only thereof, and having the supply tube extending approximately throughout the entire length of the hush-tube.

MICHAEL D. HELFRICH.